United States Patent [19]

Saito et al.

[11] Patent Number: 5,714,130

[45] Date of Patent: *Feb. 3, 1998

[54] EXHAUST GAS CLEANER AND METHOD FOR CLEANING EXHAUST GAS

[75] Inventors: Mika Saito; Akira Abe; Kiyohide Yoshida; Satoshi Sumiya; Masataka Furuyama, all of Kumagaya, Japan

[73] Assignee: Kabushiki Kaisha Riken, Tokyo, Japan

[*] Notice: The term of this patent shall not extend beyond the expiration date of Pat. No. 5,658,542.

[21] Appl. No.: 466,988

[22] Filed: Jun. 6, 1995

[30] Foreign Application Priority Data

| Nov. 28, 1994 | [JP] | Japan | 6-317582 |
| Dec. 12, 1994 | [JP] | Japan | 6-332162 |
| Dec. 15, 1994 | [JP] | Japan | 6-333468 |
| Dec. 15, 1994 | [JP] | Japan | 6-333537 |
| Dec. 16, 1994 | [JP] | Japan | 6-333870 |
| Jan. 30, 1995 | [JP] | Japan | 7-032963 |

[51] Int. Cl.$^6$ .............................. B01D 53/56
[52] U.S. Cl. .................. 423/239.1; 423/213.2; 423/213.5; 423/213.7; 423/239.2
[58] Field of Search ............... 423/213.2, 213.5, 423/213.7, 239.1, 239.2

[56] References Cited

U.S. PATENT DOCUMENTS

| 5,049,364 | 9/1991 | Yoshimoto et al. | 423/239 |
| 5,208,202 | 5/1993 | Muramatsu et al. | 502/302 |
| 5,213,781 | 5/1993 | Abe et al. | 423/239 |
| 5,384,110 | 1/1995 | Muramatsu et al. | 423/239.1 |
| 5,589,432 | 12/1996 | Yoshida et al. | 502/325 |
| 5,645,804 | 7/1997 | Sumiya et al. | 423/239.1 |

FOREIGN PATENT DOCUMENTS

| 0 362 960 A3 | 4/1990 | European Pat. Off. |
| 0577438 | 1/1994 | European Pat. Off. | 423/239.1 |
| 0 577 438 A3 | 4/1994 | European Pat. Off. |
| 0 605 251 A1 | 7/1994 | European Pat. Off. |
| 0 661 089 A2 | 7/1995 | European Pat. Off. |
| 63-100919 | 5/1988 | Japan |
| 63-283727 | 11/1988 | Japan |
| 1-130735 | 5/1989 | Japan |
| 4-354536 | 12/1992 | Japan |
| 6198195 | 7/1994 | Japan | 423/239.1 |
| 6277454 | 10/1994 | Japan | 423/239.1 |
| 2 236 493 | 4/1991 | United Kingdom |
| 2 248 194 | 4/1992 | United Kingdom |

Primary Examiner—Gary P. Straub
Assistant Examiner—Timothy C. Vanoy
Attorney, Agent, or Firm—Browdy and Neimark

[57] ABSTRACT

An exhaust gas cleaner is constituted by a first Ag catalyst, a second Ag catalyst, a transition metal catalyst selected from the group consisting of a Pt catalyst, a W catalyst, a W+Pt catalyst and a mixed catalyst of the Pt catalyst and the W catalyst. The second Ag catalyst and the Pt catalyst may be physically mixed together to form a mixed catalyst. Another exhaust gas cleaner is constituted by an Ag catalyst, a Cu catalyst and a W+Pt catalyst. The Cu catalyst and the W+Pt catalyst may be physically mixed together to form a mixed catalyst. Still another exhaust gas cleaner is constituted by a mixed catalyst of an Ag catalyst and a Cu catalyst. The exhaust gas cleaner can effectively remove nitrogen oxides in a wide temperature range of exhaust gas.

6 Claims, No Drawings

EXHAUST GAS CLEANER AND METHOD FOR CLEANING EXHAUST GAS

BACKGROUND OF THE INVENTION

The present invention relates to an exhaust gas cleaner for effectively removing nitrogen oxides by reduction from an exhaust gas containing nitrogen oxides and an excess amount of oxygen, and a method for cleaning an exhaust gas with such an exhaust gas cleaner.

Various exhaust gases discharged from internal combustion engines such as automobile engines, etc., combustion apparatuses installed in factories, home fun heaters, etc. contain nitrogen oxides such as nitrogen monoxide and nitrogen dioxide together with an excess amount of oxygen. The term "containing an excess amount of oxygen" means that the oxygen content is larger than its stoichiometric amount relative to unburned components such as carbon monoxide, hydrogen, hydrocarbons in the exhaust gas. The term "nitrogen oxides" (NOx) means nitrogen monoxide and/or nitrogen dioxide.

The nitrogen oxides are one of causes of acid rain, posing a serious problem of environmental pollution. For these reasons, various methods have been proposed to remove nitrogen oxides from exhaust gases emitted from various combustion equipment.

In the case of large, stationary combustion apparatuses such as large combustion apparatuses of factories, ammonia is introduced into an exhaust gas, whereby nitrogen oxides in the exhaust gas are catalytically and selectively reduced (selective catalytic reduction).

However, such a method is disadvantageous, because ammonia is expensive, because ammonia is so toxic that the amount of ammonia should be controlled by measuring the concentration of nitrogen oxides in the exhaust gas, and because this reduction system generally needs large apparatuses.

There is an alternative method for reducing NOx, which comprises contacting an exhaust gas containing oxygen and NOx with a gaseous reducing agent such as hydrogen, carbon monoxide and hydrocarbons (non-selective catalytic reduction). However, this method requires a larger amount of the reducing agent than its stoichiometric amount relative to oxygen in the exhaust gas to carry out effective removal of NOx. Accordingly, this method is effective only for the exhaust gas having a relatively low oxygen concentration, which is generated by burning nearly at a theoretical air-fuel ratio.

There have been proposed methods of reducing nitrogen oxides by adding to an exhaust gas a reducing agent in a smaller amount than a stoichiometric amount relative to oxygen in the exhaust gas, in the presence of a catalyst such as zeolite with or without carrying a transition metal (Japanese Patent Laid-Open Nos. 63-100919, 63-283727 and 1-130735). Further, Japanese Patent Laid-Open No. 4-354536 has disclosed a method in which nitrogen oxides are reduced on a catalyst comprising γ-alumina carrying alkaline earth metal and/or silver by adding to an exhaust gas a gaseous hydrocarbon.

However, these methods are effective only in a narrow temperature range. Also, their efficiency of removing nitrogen oxides is extremely low in the case of an actual exhaust gas because it contains about 10% of moisture and the temperature thereof largely depends on the operating condition.

OBJECT AND SUMMARY OF THE INVENTION

Accordingly, an object of the present invention is to provide an exhaust gas cleaner and a method capable of efficiently removing nitrogen oxides by reduction from an exhaust gas containing nitrogen oxides and oxygen in an amount larger than the stoichiometric amount relative to unburned components such as carbon monoxide, hydrogen, hydrocarbons, etc., which is discharged from stationary combustion apparatuses, gasoline engines operated under oxygen excess conditions, and diesel engines.

As a result of intense research in view of the above objects, the inventors have found that (1) nitrogen-containing compounds such as nitrous acid ester, ammonia, etc. and aldehydes are by-produced during the reduction of nitrogen oxides when an exhaust gas externally added with a reducing agent such as hydrocarbons and oxygen-containing organic compounds is brought into contact with an Ag catalyst, (2) the by-produced aldehydes can be advantageously utilized to reduce nitrogen oxides on another Ag catalyst carrying a larger amount of Ag component than in the former Ag catalyst, (3) the nitrogen-containing compounds can be effectively reduced to nitrogen on a Cu catalyst or W catalyst, and (3) the remaining hydrocarbons, carbon monoxide and soluble organic fraction (SOF) in exhaust gas from diesel engines are oxidized on a W catalyst or Pt catalyst. Based on these findings, the inventors have further found that nitrogen oxides can be effectively removed even from an exhaust gas containing 10% moisture at a wide temperature range when the exhaust gas is, after being added with the reducing agent, brought contact with an exhaust gas cleaner comprising a specific combination of the above catalysts. The present invention has been completed based on these findings.

Thus, in a first aspect of the present invention, there is provided an exhaust gas cleaner for removing nitrogen oxides by reduction, which is constituted by (1) a first Ag catalyst comprising a first porous inorganic oxide supporting 0.2–12 weight % of at least one Ag component selected from the group consisting of Ag and compounds of Ag; (2) a second Ag catalyst comprising a first porous inorganic oxide supporting 0.5–15 weight % of at least one Ag component selected from the group consisting of Ag and compounds of Ag, the amount of the Ag component carried on the second Ag catalyst being larger than that of the first Ag catalyst; and (3) a transition metal catalyst selected from the group consisting of a Pt catalyst, a W catalyst, a W+Pt catalyst and a mixed catalyst of the Pt catalyst and the W catalyst, the Pt catalyst comprising a second porous inorganic oxide supporting 0.01–5 weight % of at least one Pt component selected from the group consisting of Pt, Pd, Ru, Rh, Ir and Au, the W catalyst comprising a third porous inorganic oxide supporting 0.5–30 weight % of at least one W component selected from the group consisting of oxides of W, V, Mo, Mn, Nb and Ta, and the W+Pt catalyst comprising a fourth porous inorganic oxide supporting 0.01–5 weight % of at least one Pt component and 0.2–10 weight % of at least one W component. The first Ag catalyst, second Ag catalyst and transition metal catalyst are disposed in this order from the inlet side to the out let side of an exhaust gas cleaner.

In a second aspect of the present invention, there is provided an exhaust gas cleaner for removing nitrogen oxides by reduction, which is constituted by (1) a first Ag catalyst comprising a first porous inorganic oxide supporting 0.2–12 weight % of at least one Ag component selected from the group consisting of Ag and compounds of Ag; and (2) a mixed catalyst of (a) the above second Ag catalyst and (b) the above Pt catalyst. The first Ag catalyst is disposed on the inlet side and the mixed catalyst on the outlet side of the exhaust gas cleaner.

In a third aspect of the present invention, there is provided an exhaust gas cleaner for removing nitrogen oxides by reduction, which is constituted by (1) an Ag catalyst comprising a first porous inorganic oxide supporting 0.2–15 weight % of at least one Ag component selected from the group consisting of Ag and compounds of Ag, (2) a Cu catalyst comprising a second porous inorganic oxide supporting 0.2–30 weight % of at least one Cu component selected from the group consisting of oxides and sulfates of Cu, and optionally 30 weight % or less of at least one W component selected from the group consisting of oxides of W, V and Mo, and (3) a W+Pt catalyst comprising a third porous inorganic oxide supporting 0.01–5 weight % of at least one Pt component selected from the group consisting of Pt, Pd, Ru, Rh, Ir and Au, and 0.2–10 weight % of at least one W component selected from the group consisting of oxides of W, V, Mo, Mn, Nb and Ta. The Ag catalyst, Cu catalyst and W+Pt catalyst are disposed in this order from the inlet side to the out let side of an exhaust gas.

In a fourth aspect of the present invention, there is provided an exhaust gas cleaner for removing nitrogen oxides by reduction, which is constituted by (1) an Ag catalyst as defined above and (2) a mixed catalyst of (a) the above Cu catalyst and (b) the above W+Pt catalyst. The Ag catalyst is disposed on the inlet side and the mixed catalyst on the outlet side of an exhaust gas cleaner.

In a fifth aspect of the present invention, there is provided an exhaust gas cleaner for removing nitrogen oxides by reduction, which is constituted by (1) a mixed catalyst of (a) an Ag catalyst and (b) a Cu catalyst, the Ag catalyst comprising a first porous inorganic oxide supporting 0.2–15 weight % of at least one Ag component selected from the group consisting of Ag and compounds of Ag, and the Cu catalyst comprising a second porous inorganic oxide supporting 0.5–30 weight % of at least one Cu component selected from the group consisting of oxides and sulfates of Cu, and optionally 5 weight % or less of at least one component selected from the group consisting of alkali metal elements, rare earth elements and oxides thereof, or 30 weight % or less of at least one W component selected from the group consisting of oxides of W, V, Mo, Mn, Nb and Ta, and optionally (2) a Pt catalyst comprising a third porous inorganic oxide supporting 0.01–5 weight % of at least one Pt component selected from the group consisting of Pt, Pd, Ru, Rh, Ir and Au, or a W+Pt catalyst comprising a fourth porous inorganic oxide supporting 0.2–10 weight % of at least one W component selected from the group consisting of oxides of W, V, Mo, Mn, Nb and Ta and the above Pt component. The mixed catalyst is disposed on the inlet side and the optional Pt or W+Pt catalyst on the outlet side of an exhaust gas cleaner.

In a sixth aspect of the present invention, there is provided a method for removing nitrogen oxides by reduction from an exhaust gas containing nitrogen oxides and oxygen in an amount larger than its stoichiometric amount relative to unburned components in said exhaust gas, which comprises (1) disposing an exhaust gas cleaner as defined above in a flow path of the exhaust gas; (2) introducing into the exhaust gas at least one reducing agent selected from the group consisting of hydrocarbons and oxygen-containing organic compounds on an upstream side of the exhaust gas cleaner; and (3)bringing the resulting exhaust gas containing the reducing agent into contact with the exhaust gas cleaner at 150°–650° C., thereby causing a reaction of the nitrogen oxides with the reducing agent to remove the nitrogen oxides by reduction.

DETAILED DESCRIPTION OF THE
PREFERRED EMBODIMENTS

The exhaust gas cleaner of the present invention may be basically in two forms.

The exhaust gas cleaner of a first preferred form is obtained by coating on a cleaner substrate at least one catalyst comprising a powdery porous inorganic oxide carrying one or more catalytically active components. The exhaust gas cleaner of such a form may be also obtained by carrying the catalytically active components onto a porous inorganic oxide powder coated on a cleaner substrate. Preferable materials for the cleaner substrate include porous, heat-resistant ceramics having a large specific surface area such as γ-alumina, titania, zirconia and their composite oxides such as γ-alumina-titania, γ-alumina-silica, γ-alumina-zirconia, titania-zirconia, etc. When a high heat resistance is required, cordierite, mullite, alumina or its composite oxides are preferable. Also, the cleaner substrate may be formed from a known metal material.

The shape and size of the cleaner substrate may be changed depending on applications. Practically, the cleaner substrate may be fabricated from two parts or more such as an inlet portion, an intermediate portion, an outlet portion, etc. The cleaner substrate may be of a three-dimensional structure such as a honeycomb, a foam, a refractory fiber assembly, etc. Further, the cleaner substrate may be of granules or pellets. Each of the catalysts may be coated on different portions of the same cleaner substrate. Alternatively, each catalyst may be coated on separate cleaner substrates, and thereafter, fabricated into an exhaust gas cleaner.

The exhaust gas cleaner of a second preferred form may be produced by charging into a suitable reactor such as a catalytic converter, which is equipped with at least inlet and outlet portions, each of the catalysts obtained by carrying one or more catalytically active components on a pelletized, granular or powdery porous inorganic oxide, or obtained by forming a porous inorganic oxide carrying one or more catalytically active components into pellet, granule or powder.

In the present description and claims, the weight percentage of the catalytically active component is expressed by metal basis and based on the amount of porous inorganic oxide on which the component concerned is carried.

[A] Ag Catalyst

The Ag catalyst comprises a porous inorganic oxide supporting at least one Ag component selected from the group consisting of Ag and compounds of Ag. In the cleaners of the first and second aspects of the present invention, the Ag catalyst is made of two parts, i.e., a first Ag catalyst and a second Ag catalyst which carries an Ag component in a larger amount than in the first Ag catalyst.

[A-1] Ag component

The Ag component is at least one of Ag and compounds of Ag. The compounds of Ag may include oxides of Ag, halides of Ag, sulfates of Ag and phosphates of Ag. Preferred Ag components are Ag, oxides of Ag, silver chloride and silver sulfate, and more preferred are Ag, oxides of Ag and silver chloride.

The amount of the Ag component supported on a porous inorganic oxide is 0.2–15 weight %, and preferably 0.5–12 weight %. When the amount is less than 0.2 weight %, the removal ratio of the nitrogen oxides is low. On the other hand, the amount exceeding 15 weight % also decreases the NOx removal ratio because the reducing agent such as hydrocarbons and oxygen-containing organic compounds is likely to be predominantly burnt.

In the Ag catalyst made of two parts, the amount of the Ag component of the first Ag catalyst is 0.2–12 weight %, and preferably 0.5–10 weight %. When the amount is less than 0.2 weight %, the removal ratio of the nitrogen oxides is low.

On the other hand, the amount exceeding 15 weight % also decreases the NOx removal ratio because the reducing agent such as hydrocarbons and oxygen-containing organic compounds is likely to be predominantly burnt.

The amount of the Ag component of the second Ag catalyst is 0.5–15 weight %, preferably 1–12 weight %, and should be larger than that of the first Ag catalyst. When the amount is less than 0.5 weight % or less than that of the first Ag catalyst, the reduction of NOx by the aldehyde generated on the first Ag catalyst does not proceed sufficiently. On the other hand, the amount exceeding 15 weight % also decreases the NOx removal ratio because the reducing agent such as hydrocarbons and oxygen-containing organic compounds is likely to be predominantly burnt.

[A-2] Porous inorganic oxide for Ag catalyst (first and second Ag catalysts)

The porous inorganic oxide for the Ag catalyst is at least one heat-resistant porous ceramic having a large specific surface area selected from the group consisting of alumina, silica, titania, zirconia, zeolite and composite oxides thereof, and preferably at least one of γ-alumina, titania, zeolite and composite oxides thereof. Ag and the compounds of Ag on these oxides promote the reaction of the nitrogen oxides with the reducing agent such as hydrocarbons and oxygen-containing organic compounds or remaining hydrocarbons in exhaust gas. In particular, a catalyst comprising an alumina-based composite oxide or oxide mixtures containing alumina shows improved durability and heat resistance even in the presence of sulfur dioxide in exhaust gas. The alumina content of an alumina-based composite oxide or an oxide mixture containing alumina is preferred to be 50 weight % or more.

The specific surface area of the first porous inorganic oxide is preferably 10 $m^2/g$ or more, and more preferably 30 $m^2/g$ or more. When the specific surface area is smaller than 10 $m^2/g$, the catalytically active component supported on the porous inorganic oxide does not come into contact with the exhaust gas in a large contact area, failing to remove nitrogen oxides efficiently.

[A-3] Preparation of Ag catalyst

The Ag catalyst, including the first and second Ag catalysts, is prepared by carrying the Ag component on the porous inorganic oxide described above by known methods such as an impregnation method, a precipitation method, etc. When zeolite is used, the active component may be carried thereon also by an ion-exchanging method.

Ag and/or Ag oxides may be carried by immersing the porous inorganic oxide into an aqueous solution of silver nitrate, etc., drying at about 50°–150° C., preferably at about 70° C., and then subjecting the dried product to calcination by heating it stepwise from about 100° C. to about 600° C. in air, nitrogen gas stream containing oxygen or hydrogen gas stream. When the calcination is conducted in hydrogen gas stream, the calcined product is preferred to be subjected to oxidation treatment at 300°–650° C.

Silver sulfate may be carried, for example, by immersing the porous inorganic oxide in a solution of silver sulfate in aqueous nitric acid, and then followed by the same drying and calcination steps as described above.

Silver phosphate may be carried, for example, by immersing the porous inorganic oxide in an aqueous solution of silver nitrate while adding little by little phosphoric acid or ammonium phosphate under stirring. The mixture is further stirred for 4 hours while shielding the light. After drying, the resulting porous inorganic oxide is calcined at 120° C. for one hour, 450° C. for 3 hours to obtain a porous inorganic oxide carrying silver phosphate, and finally calcined at 600° C. for 3 hours.

When silver halide is to be carried, the porous inorganic oxide impregnated with an aqueous solution of silver nitrate, etc. is further immersed in an aqueous solution of ammonium halide to convert the silver nitrate into silver halide precipitation, and then followed by the same drying and calcination steps as described above.

It has been observed that the Ag component carried on the porous inorganic oxide forms nearly circular aggregate upon the calcination in oxidative atmosphere. The average diameter, determined arithmetically, of the aggregate is 10–10000 nm, preferably 10–5000 nm, and more preferably 10–2000 nm. Generally the smaller the average diameter of the aggregate, the higher the activity of the Ag catalyst. However, when the average diameter is less than 10 nm, the reducing agent (hydrocarbons and/or oxygen-containing organic compounds) is likely to be predominantly oxidized, resulting in a decrease in the removal ratio of nitrogen oxides. On the other hand, when the average diameter is larger than 10000 nm, the catalytic activity of the Ag component becomes low, resulting in a low removal ratio of nitrogen oxides.

The Ag catalyst, including the first and second Ag catalysts, may be coated on a cleaner substrate as described above by known methods such as a wash-coating method, etc. The thickness of the Ag catalyst coated on the cleaner substrate is preferably up to 300 μm, though it is usually restricted by the difference in a thermal expansion coefficients between the first catalyst and the cleaner substrate. With such thickness, it is possible to prevent the cleaner from being broken by a thermal shock, etc. during NOx-removing operations.

The amount of the Ag catalyst coated onto a surface of the cleaner substrate is preferably 20–300 g/liter, more preferably 50–200 g/liter based on the cleaner substrate. When the amount is less than 20 g/liter, a sufficient removal ratio of the nitrogen oxides cannot be achieved. On the other hand, an amount more than 300 g/liter gives no additional increase in removal efficiency, but results in a higher loss of pressure.

[B] Pt Catalyst

The Pt catalyst comprises a porous inorganic oxide supporting a Pt component. The Pt catalyst is disposed at the outlet side of the exhaust gas cleaner and is concerned in the reduction of NOx at a relatively low temperature range and the oxidation of carbon monoxide, hydrocarbons and SOF. Further, the Pt catalyst is optionally and physically mixed with the second Ag catalyst to present a mixed catalyst on which the reduction by the second Ag catalyst and the oxidation by the Pt catalyst proceed simultaneously without adversely affecting each other. The Pt catalyst may be also mixed with the W catalyst.

[B-1] Pt component

The Pt component is one or more of Pt, Pd, Ru, Rh, Ir and Au, and one or more of Pt, Pd, Ru, Rh and Au is preferable. At least one of Pt, Pd and Au is more preferred.

The amount of the Pt component supported on the porous inorganic oxide is 0.01–5 weight %, and preferably 0.01–4 weight %. The amount more than 5 weight % gives no additional improvement in the removal efficiency.

The Pt catalyst may further carry 10 weight % or less of at least one element selected form the group consisting of rare earth elements such as La, Ce, etc., alkaline earth elements such as Ca, Mg, etc. and alkali elements such as Na, K, etc. to enhance the heat resistance of the Pt catalyst. A known oxidation catalyst or a three-way catalyst may be used in place of the Pt catalyst.

[B-2] Porous inorganic oxide for Pt catalyst

The porous inorganic oxide for the Pt catalyst is at least one porous and heat-resistant ceramics selected from the group consisting of alumina, titania, zirconia, silica, zeolite and composite oxides thereof. The specific surface area is preferably 10 $m^2/g$ or more.

[B-3] Preparation of Pt catalyst

The Pt component may be carried on the porous inorganic oxide basically in the same manner as in the preparation of the Ag catalyst.

For example, the porous inorganic oxide is immersed in a solution containing the Pt component, such as aqueous solution of chloroplatinic acid, chloroauric acid, palladium chloride, etc., and subjected to the same drying and calcination steps as in the preparation of the Ag catalyst. The Pt component may be exist either in the form of element or oxide at working temperatures at which the cleaner is used.

The Pt catalyst and a mixed catalyst of the Pt catalyst with the second Ag catalyst or the W catalyst may be coated on a cleaner substrate. The thickness and the coated amount is the same as in the Ag catalyst.

[C] W Catalyst

The W catalyst comprises a porous inorganic oxide supporting a W component. The W catalyst is disposed at the outlet side of the exhaust gas cleaner and is concerned in the reduction of NOx at a relatively low temperature range by using the nitrogen-containing compound, in particular, ammonia generated on the Ag catalyst and the oxidation of carbon monoxide and hydrocarbons. Further, the W catalyst is optionally and physically mixed with the Pt catalyst to present a mixed catalyst.

[C-1] W component

The W component is at least one of oxides of W, V, Mo, Mn, Nb and Ta. Oxides of W and/or Mn are more preferred.

The amount of the W component supported on a porous inorganic oxide is 0.5–30 weight %, and preferably 1–25 weight %.

[C-2] Porous inorganic oxide for W catalyst

The porous inorganic oxide for the W catalyst is at least one heat-resistant porous ceramic having a large specific surface area selected from the group consisting of alumina, titania, zeolite and composite oxides The specific surface area is preferably 10 $m^2/g$ or more. thereof.

[C-3] Preparation of W catalyst

The W component may be carried on the porous inorganic oxide basically in the same manner as in the preparation of the Ag catalyst.

For example, the porous inorganic oxide is immersed in a solution containing the W component, such as aqueous solution of ammonium salt, etc. of W, V, Mo, Mn, Nb and Ta, and subjected to the same drying and calcination steps as in the preparation of the Ag catalyst, thereby carrying oxide of the above element.

Titania carrying the W component may be prepared by using metatitanic acid (hydrated titanium oxide) as the starting material in place of titania.

The W catalyst with or without physically mixed with the Pt catalyst may be coated on a cleaner substrate. The thickness and the coated amount is the same as in the Ag catalyst.

[D] W+Pt Catalyst

The Pt component and the W component, both described above, may be simultaneously carried on a porous inorganic oxide which may be the same as that for the Pt catalyst. The W+Pt catalyst is concerned with converting noxious components such as carbon monoxide, hydrocarbons, SOF in exhaust gases into innocuous states by oxidation. In addition, it can prevent the oxidation of sulfur dioxide.

The amount of the Pt component supported on the porous inorganic oxide is 0.01–5 weight %, preferably 0.01–4 weight %, and 0.2–10 weight %, preferably 0.2–9 weight % for the W component. The porous inorganic oxide for the W+Pt catalyst may include at least one oxide selected from the group consisting of alumina, titania, zirconia, silica, zeolite and composite oxides thereof.

The Pt component and W component may be carried on the porous inorganic oxide basically in the same manner as in the preparation of the Pt catalyst or W catalyst. The W+Pt catalyst may be prepared by immersing a porous inorganic oxide in a solution dissolving both the components, or successively immersed in solutions of each component.

The W+Pt catalyst may further carry 10 weight % or less of at least one element selected form the group consisting of rare earth elements such as La, Ce, Pr, Nd, etc., alkaline earth elements such as Ca, Mg, etc. and alkali elements such as Na, K, Cs, etc. to enhance the heat resistance of the Pt component.

The W+Pt catalyst may be coated on a cleaner substrate with or without physically mixed with the Cu catalyst. The thickness and the coated amount is the same as in the Ag catalyst.

[E] Cu Catalyst

The Cu catalyst comprises a porous inorganic oxide supporting a Cu component alone or in combination with a W component or an alkali/rare earth component. With the Cu catalyst, nitrogen oxides, and nitrous acid esters and ammonia generated on the Ag catalyst are effectively reduced to nitrogen. The Cu catalyst may be mixed with the Ag catalyst or the W+Pt catalyst.

[E-1] Cu component

The Cu component is at least one of oxides and sulfates of Cu. When the Cu catalyst is mixed with the Ag catalyst, the Cu component is preferred to be at least one of copper, oxides of copper, sulfates of copper and halides of copper.

The amount of the Cu component supported on a porous inorganic oxide is 0.2–30 weight %, preferably 0.5–25 weight %. When the Cu catalyst is mixed with the Ag catalyst, the amount is 0.5–30 weight %, preferably 0.5–25 weight %.

[E-2] W component

The optional W component for the Cu catalyst is at least one of oxides of W, V, Mo, Mn, Nb and Ta. Oxides of W, V and Mo are more preferable, and W and V are further preferable.

The amount of the W component supported on a porous inorganic oxide is 30 weight % or less, preferably 25 weight % or less.

The total amount of the Cu component and the W component is 0.2–60 weight %, preferably 0.5–50 weight %.

[E-3] Alkali/rare earth component

The alkali/rare earth component is at least one selected from the group consisting of alkali metals, rare earth elements and oxides thereof. Preferred alkali metals may include Na, K, Cs, etc., and preferred rare earth elements may include La, Ce, etc.

The amount of the alkali/rare earth component supported on a porous inorganic oxide is 5 weight % or less, preferably 4 weight % or less.

[E-4] Porous inorganic oxide for Cu catalyst

The porous inorganic oxide for Cu catalyst is at least one heat-resistant porous ceramic having a large specific surface area selected from the group consisting of alumina, titania, zeolite, silica, zirconia and composite oxides thereof. At least one of γ-alumina, titania, zeolite and composite oxides thereof is preferred. The specific surface area is preferably 10 $m^2/g$ or more.

[E-5] Preparation of Cu catalyst

The Cu component, W component and alkali/rare earth component may be carried on the porous inorganic oxide basically in the same manner as in the preparation of the Ag catalyst.

As the solution in which the porous inorganic oxide is immersed, an aqueous solution of copper sulfate, copper nitrate, copper acetate, copper halides, etc. may be used for carrying the Cu component, and an aqueous solution of ammonium salt, etc. of W, V, Mo, etc. for the W component. An aqueous solution of acetates, nitrates, carbonates of the alkali metal elements and an aqueous solution of nitrates, halides, etc. of the rare earth elements may be used for carrying the alkali/rare earth component When the Cu component is carried together with the W component or the alkali/rare earth component, the porous inorganic oxide may be immersed in a solution dissolving both the components, or successively immersed in solutions of each component.

Titania carrying the W component may be prepared by using metatitanic acid (hydrated titanium oxide)as the starting material in place of titania. When zeolite is used, the active component may be carried thereon also by an ion-exchanging method.

The Cu catalyst with or without the Ag catalyst or the W+Pt catalyst may be coated on a cleaner substrate. The thickness and the coated amount is the same as in the Ag catalyst.

[F] Weight Ratio of Catalysts

In the exhaust gas cleaner of the first aspect of the present invention, the weight ratio of the first Ag catalyst to the second Ag catalyst is 1:10 to 20:1, preferably 1:10 to 10:1, and more preferably 1:5 to 5:1. When the ratio is less than 1:10 (excess of the second Ag catalyst), a sufficiently high removal ratio of the nitrogen oxides cannot be achieved in a wide temperature range of 150°–650° C. On the other hand, when the ratio is higher than 20:1 (excess of the first Ag catalyst), the aldehyde generated on the first Ag catalyst is not effectively used for reducing NOx, or carbon monoxide and SOF remain not oxidized.

The weight ratio of the total amount of the first and second Ag catalysts to the transition metal catalyst (Pt catalyst, W catalyst, W+Pt catalyst and mixed catalyst) is 1:5 to 10:1, preferably 1:4 to 5:1. When the ratio is less than 1:5 (excess of the transition metal catalyst), a sufficiently high removal ratio of the nitrogen oxides cannot be achieved in a wide temperature range of 150°–650° C. On the other hand, when the ratio is higher than 10:1 (excess of the first and second Ag catalysts), hydrocarbons and carbon monoxide remain not oxidized, or the nitrogen-containing compound such as nitrous acid esters, ammonia, etc. generated on the first Ag catalyst is not effectively used to reduce NOx.

The mixing ratio of the W catalyst and the Pt catalyst in the mixed catalyst is 2:1 to 100:1, preferably 5:1 to 90:1 by weight. When the ratio is less than 2:1 (excess of the Pt catalyst), a sufficiently high removal ratio of the nitrogen oxides cannot be achieved in a wide temperature range of 150°–650° C. On the other hand, when the ratio is higher than 100:1 (excess of the W catalyst), hydrocarbons and carbon monoxide remain not oxidized.

In the exhaust gas cleaner of the second aspect of the present invention, the mixing ratio of the second Ag catalyst and the Pt catalyst is 2:1 to 200:1, preferably 5:1 to 100:1. When the ratio is less than 2:1 (excess of the Pt catalyst), a sufficiently high removal ratio of the nitrogen oxides cannot be achieved in a wide temperature range of 150°–650° C. On the other hand, when the ratio is higher than 200:1 (excess of the second Ag catalyst), hydrocarbons and carbon monoxide remain not oxidized.

The weight ratio of the first Ag catalyst to the mixed catalyst of the second Ag catalyst and the Pt catalyst is 1:10 to 10:1, preferably 1:5 to 5:1. When the ratio is less than 1:10 (excess of the mixed catalyst), a sufficiently high removal ratio of the nitrogen oxides cannot be achieved in a wide temperature range of 150°–650° C. On the other hand, when the ratio is higher than 10:1 (excess of the first Ag catalyst), the aldehyde generated on the first Ag catalyst is not effectively used to reduce NOx, or hydrocarbons and carbon monoxide remain not oxidized.

In the exhaust gas cleaner of the third aspect of the present invention, the weight ratio of the Ag catalyst and the Cu catalyst is 1:10 to 10:1, preferably 1:5 to 10:1. When the ratio is less than 1:10 (excess of the Cu catalyst), a sufficiently high removal ratio of the nitrogen oxides cannot be achieved in a wide temperature range of 150°–650° C. On the other hand, when the ratio is higher than 10:1 (excess of the Ag catalyst), the nitrogen-containing compound such as nitrous acid esters, ammonia, etc. generated on the Ag catalyst is not effectively reduced to nitrogen, or the aldehyde generated on the Ag catalyst is not effectively used to reduce NOx.

The weight ratio of the Ag catalyst and the W+Pt catalyst is 1:5 to 20:1, preferably 1:4 to 10:1. When the ratio is less than 1:5 (excess of the W+Pt catalyst), a sufficiently high removal ratio of the nitrogen oxides cannot be achieved in a wide temperature range of 150°–650° C. On the other hand, when the ratio is higher than 20:1 (excess of the Ag catalyst), hydrocarbons, carbon monoxide and SOF remain not oxidized.

In the exhaust gas cleaner of the fourth aspect of the present invention, the mixing ratio of the Cu catalyst and the W+Pt catalyst is 100:50 to 100:1, preferably 100:30 to 100:1 by weight. When the ratio is less than 100:50 (excess of the W+Pt catalyst), a sufficiently high removal ratio of the nitrogen oxides cannot be achieved in a wide temperature range of 150°–650° C. On the other hand, when the ratio is higher than 100:1 (excess of the Cu catalyst), hydrocarbons and carbon monoxide remain not oxidized.

The weight ratio of the Ag catalyst and the mixed catalyst is 1:5 to 20:1, preferably 1:4 to 10:1. When the ratio is less than 1:5 (excess of the mixed catalyst), a sufficiently high removal ratio of the nitrogen oxides cannot be achieved in a wide temperature range of 150°–650° C. On the other hand, when the ratio is higher than 20:1 (excess of the Ag catalyst), the nitrogen-containing compound such as nitrous acid esters, ammonia, etc. generated on the Ag catalyst is emitted without reduced to nitrogen, or hydrocarbons and carbon monoxide remain not oxidized.

In the exhaust gas cleaner of the fifth aspect of the present invention, the mixing ratio of the Ag catalyst and the Cu catalyst is 1:10 to 10:1, preferably 1:5 to 10:1 by weight. When the ratio is less than 1:10 (excess of the Cu catalyst), a sufficiently high removal ratio of the nitrogen oxides cannot be achieved in a wide temperature range of 150°–650° C. On the other hand, when the ratio is higher than 10:1 (excess of the Ag catalyst), the nitrogen-containing compound such as nitrous acid esters, ammonia, etc. is not sufficiently reduced to nitrogen, or the aldehyde is not effectively used to reduce NOx.

The weight ratio of the mixed catalyst and the Pt catalyst or W+Pt catalyst is 1:5 to 20:1, preferably 1:4 to 10:1. When the ratio is less than 1:5 (excess of the Pt catalyst or W+Pt catalyst), a sufficiently high removal ratio of the nitrogen oxides cannot be achieved in a wide temperature range of 150°–650° C. On the other hand, when the ratio is higher than 20:1 (excess of the mixed catalyst), hydrocarbons, carbon monoxide and SOF remain not oxidized.

[G] Method of Cleaning Exhaust Gas

With the exhaust gas cleaner described above, NOx can be effectively removed even from exhaust gas containing about 10% moisture at a wide temperature range of 150°–650° C.

[G-1] Reducing Agent

The exhaust gas usually contains residual hydrocarbons such as ethylene, propylene, etc. to some extent. Since the amounts of residual hydrocarbons is not sufficient to reduce all nitrogen oxides in the exhaust gas, at least one reducing agent should be externally introduced into the exhaust gas. A site for introducing the reducing agent is an upstream side of the exhaust gas cleaner.

The reducing agent to be added to exhaust gas may include hydrocarbons and oxygen-containing organic compounds having at least two carbon atoms. The reducing agent may be added together with a fuel such as gasoline, diesel oil, kerosene, etc.

The hydrocarbons are alkanes, alkenes and alkynes which may be gaseous or liquid at the normal state (25° C., 1 atm). The alkanes and alkenes are preferred to have 2 or more carbon atoms. The liquid hydrocarbons may be diesel oil, cetane, heptane, kerosene, gasoline, etc., and those having a boiling point of 50°–350° C. are preferable.

The oxygen-containing organic compound having at least two carbon atoms may include alcohols having two or more of carbon atoms such as ethanol, isopropyl alcohol, etc.

The weight ratio (the reducing agent externally added with or without the above fuel/nitrogen oxides in exhaust gas) is preferably 0.1–5. When the weight ratio is less than 0.1, the removal ratio of nitrogen oxides is not improved. On the other hand, when the weight ratio is more than 5, fuel efficiency is low.

[G-2] Apparent Space Velocity

To efficiently proceed the reduction of nitrogen oxides with the oxygen-containing organic compounds, hydrocarbons, nitrous acid esters or ammonia, the apparent space velocity of the exhaust gas passing through each of the catalysts is preferably controlled.

On the Ag catalyst, the apparent space velocity is 150,000 $h^{-1}$ or less, preferably 100,000 $h^{-1}$ or less, and 200,000 $h^{-1}$ or less, preferably 150,000 $h^{-1}$ or less, and more preferably 100,000 $h^{-1}$ or less for the first and second Ag catalysts.

The apparent space velocity on the mixed catalyst of the second Ag catalyst and the Pt catalyst, the W catalyst and the Pt catalyst, or the Cu catalyst and the W+Pt catalyst is 200,000 $h^{-1}$ or less, preferably 150,000 $h^{-1}$ or less, while 150,000 $h^{-1}$ or less, preferably 100,000 $h^{-1}$ or less for the mixed catalyst of the Ag catalyst and the Cu catalyst.

On the Pt catalyst, the apparent space velocity is 250,000 $h^{-1}$ or less, preferably 200,000 $h^{-1}$ or less, while 200,000 $h^{-1}$ or less, preferably 150,000 $h^{-1}$ or less for the W catalyst and the W+Pt catalyst, and 150,000 $h^{-1}$ or less, preferably 100,000 $h^{-1}$ or less for the Cu catalyst.

When sulfur oxides are contained in an exhaust gas, the lower limit of the apparent space velocity on each of the catalysts is preferred to be 10,000 $h^{-1}$ because sulfur oxides are easily oxidized at an apparent space velocity lower than 10,000 $h^{-1}$.

[G-3] Exhaust Gas Temperature

The exhaust gas passing through the exhaust gas cleaner where the reducing agent is reacted with nitrogen oxides is kept at 150°–650° C. preferably 200°–550° C. and more preferably 300°–500° C. When the temperature is lower than 150° C., the reduction of nitrogen oxides by the reducing agent cannot be sufficiently carried out. On the other hand, when the temperature is higher than 650° C., the reducing agent is burned before reacts with the nitrogen oxides, failing to reduce the nitrogen oxides effectively.

The present invention will be described in further detail by way of the following Examples. In the following Examples, the weight percentage of the catalytically active component is expressed by metal basis based on the porous inorganic oxide on which the component concerned is carried.

EXAMPLE 1

A commercially available γ-alumina powder (specific surface area: 200 $m^2/g$) was immersed in an aqueous solution of silver nitrate and then dried at 70° C. for 2 hours. The dried powder was heated to 600° C. stepwise and calcined there for 5 hours in air to prepare an Ag catalyst carrying 3 weight % of silver. The Ag catalyst (0.26 g) was coated on a commercially available honeycomb cordierite filter (diameter: 20 mm, length: 8.3 mm, 400 cells/$in^2$), dried and then heated to 600° C. stepwise to be calcined to prepare a first Ag cleaner part.

Separately, in the same manner as above, a second Ag cleaner part coated with a second Ag catalyst carrying 5 weight % of silver was prepared.

Next, after immersed in an aqueous solution of chloroplatinic acid for 20 minutes, a titania powder (specific surface area: 35 $m^2/g$) was dried in air at 80° C. for 2 hours. The dried powder was calcined at 120° C. for 2 hours in nitrogen stream, and further calcined at 200°–400° C. for one hour while heated stepwise. The powder thus calcined were heated from 50° C. to 400° C. over 5 hours in nitrogen stream containing 4% hydrogen to be calcined there for 4 hours, and further heated from 50° over 500° C. over 5 hours in nitrogen stream containing 10% oxygen to be calcined there for 5 hours, thereby preparing a Pt catalyst carrying 0.1 weight % of platinum. A slurry containing 0.21 g of the Pt catalyst was coated on a commercially available honeycomb cordierite filter (diameter: 20 mm, length: 6.6 mm, 400 cells/$in^2$), and dried and calcined in the same manner as above to prepare a Pt cleaner part.

An exhaust gas cleaner consisting of the first Ag cleaner part, the second Ag cleaner part and the Pt cleaner part in this order from the inlet side to the outlet side was disposed in a reactor pipe. Next, a test gas having the composition shown in Table 1 was caused to pass through the reactor pipe at a flow rate of 3.48 liters per minute (the normal state: 25° C., 1 atm) while maintaining the test gas in the reactor pipe at a temperature of 300°–500° C. o reduce nitrogen oxides with ethanol. The apparent space velocities on the first Ag catalyst, second Ag catalyst and Pt catalyst were about 80,000 $h^{-1}$, 80,000 $h^{-1}$ and 100,000 $h^{-1}$, respectively.

In the present invention, the removal ratio was determined as follows. The concentration of nitrogen oxides in the effluent gas from the exhaust gas cleaner was measured by a chemiluminescence analyzer. The removal ratio was calculated according to the equation of (initial concentration—concentration after passing)/(initial concentration) ×100. The results are shown in Table 2.

TABLE 1

| Component | Concentration |
| --- | --- |
| Nitrogen monoxide | 800 ppm |
| Oxygen | 10 volume % |
| Ethanol | . 1560 ppm |
| Sulfur dioxide | 30 ppm |
| Nitrogen | Balance |
| Water | 10 volume % of the total volume of the above components |

EXAMPLE 2

A first Ag cleaner part was prepared in the same manner as in the preparation of the first Ag cleaner part of Example 1 except for coating 0.26 g of a first Ag catalyst comprising silica/alumina powder (silica content: 5 weight %, specific surface area: 350 m²/g) carrying 3 weight % of silver on a honeycomb cordierite filter (diameter: 20 mm, length: 8.3 mm, 400 cells/in²).

In the same manner as above, a second Ag cleaner part was prepared by coating 0.26 g of a second Ag catalyst comprising silica/alumina powder carrying 5 weight % of silver on a honeycomb cordierite filter of the same type as above.

An exhaust gas cleaner consisting of the first Ag cleaner part, the second Ag cleaner part and the Pt cleaner part of Example 1 in this order from the inlet side to the outlet side was disposed in a reactor pipe. The results of the same test as in Example 1 are shown in Table 2.

EXAMPLE 3

A slurry containing 0.26 g of a mixed catalyst of the second Ag catalyst and the Pt catalyst (50:1 by weight), both prepared in Example 1, was coated on a honeycomb cordierite filter (diameter: 20 mm, length: 8.3 mm, 400 cells/in²) to prepare a second Ag/Pt cleaner part in the same manner as in the preparation of the first Ag cleaner part of Example 1.

An exhaust gas cleaner consisting of the first Ag cleaner part of Example 1 on the inlet side and the second Ag/Pt cleaner part on the outlet side was disposed in a reactor pipe. The results of the same test as in Example 1 are shown in Table 2. The apparent space velocity on both the first Ag catalyst and second Ag/Pt catalyst was about 80,000 h⁻¹, respectively.

EXAMPLE 4

A slurry containing 0.26 g of a mixed catalyst of the second Ag catalyst of Example 2 and the Pt catalyst of Example 1 (50:1 by weight) was coated on a honeycomb cordierite filter (diameter: 20 mm, length: 8.3 mm, 400 cells/in²) to prepare a second Ag/Pt cleaner part in the same manner as in the preparation of the first Ag cleaner part of Example 1.

An exhaust gas cleaner consisting of the first Ag cleaner part of Example 2 on the inlet side and the above second Ag/Pt cleaner part on the outlet side was disposed in a reactor pipe. The results of the same test as in Example 1 are shown in Table 2. The apparent space velocity on both the first Ag catalyst and second Ag/Pt catalyst was about 80,000 h⁻¹, respectively.

EXAMPLE 5

An exhaust gas cleaner consisting of the first Ag cleaner part on the inlet side and the second Ag cleaner part on the outlet side, both prepared in Example 1, was disposed in a reactor pipe. The results of the same test as in Example 1 are shown in Table 2. The apparent space velocity on both the first Ag catalyst and second Ag catalyst was about 80,000 h⁻¹, respectively.

Comparative Example 1

An Ag cleaner part was prepared in the same manner as in the preparation of the first Ag cleaner part of Example 1 except that 0.52 g of the first Ag catalyst of Example 1 was coated on a honeycomb cordierite filter (diameter: 20 mm, length: 16.6 mm, 400 cells/in²). The Ag cleaner part alone was disposed in a reactor pipe. The results of the same test as in Example 1 are shown in Table 2. The apparent space velocity on the Ag catalyst was about 40,000 h⁻¹.

Comparative Example 2

An Ag cleaner part was prepared in the same manner as in Comparative Example 1 except for using 0.52 g of the second Ag catalyst of Example 1 in place of the first Ag catalyst.

The results of the same test as in Comparative Example 1 are shown in Table 2.

TABLE 2

| | Removal Ratio of NOx | | | | |
|---|---|---|---|---|---|
| | Exhaust Gas Temperature (°C.) | | | | |
| | 300 | 350 | 400 | 450 | 500 |
| Examples | | | | | |
| 1 | 50.5 | 78.5 | 94.7 | 95.6 | 89.6 |
| 2 | 48.4 | 77.5 | 92.3 | 94.5 | 89.6 |
| 3 | 53.5 | 77.5 | 92.7 | 93.6 | 86.6 |
| 4 | 49.4 | 76.5 | 90.3 | 92.5 | 86.6 |
| 5 | 47.2 | 76.8 | 92.5 | 96.5 | 90.2 |
| Comparative Examples | | | | | |
| 1 | 24.6 | 45.7 | 68.9 | 82.2 | 78.8 |
| 2 | 34.3 | 54.7 | 67.4 | 72.5 | 54.5 |

As seen from Table 2, as compared with Comparative Examples 1 and 2 where only one Ag catalyst was used, Examples 1–5 showed high removal efficiency of nitrogen oxides in a wide temperature range of exhaust gas.

EXAMPLE 6

A first Ag cleaner part coated with 0.26 g of a first Ag catalyst comprising a commercially available γ-alumina powder (specific surface area: 200 m²/g) carrying 3.1 weight % of silver was prepared in the same manner as in Example 1.

A second Ag cleaner part coated with 0.26 g of a second Ag catalyst carrying 5.0 weight % of silver was prepared in the same manner as above.

Further, in the same manner as in Example 1, a Pt catalyst comprising a titania powder (specific surface area: 50 m²/g) carrying 1 weight % of platinum was prepared. After immersed for 20 minutes in an aqueous solution (tungsten concentration: 15.5 weight %) prepared by heating over a water bath a mixture of ammonium tungustate parapentahydrate, oxalic acid and water, the Pt catalyst was dried in air successively at 80° C., 100° C. and 120° C. each for 2 hours, and then heated from 120° C. to 500° C. over 5 hours and calcined there for 4 hours to prepare a W+Pt catalyst carrying 3 weight % of oxide of tungsten and 1 weight % of platinum. A slurry containing 0.26 g of the W+Pt catalyst was coated on a honeycomb cordierite filter to prepare a W+Pt cleaner part in the same manner as above.

An exhaust gas cleaner consisting of the first Ag cleaner part, the second Ag cleaner part and the W+Pt cleaner part in this order from the inlet side to the outlet side was disposed in a reactor pipe.

The results of the same test as in Example 1 are shown in Table 3. The apparent space velocity on each of the first Ag catalyst, the second Ag catalyst and the W+Pt catalyst was about 80,000 h⁻¹, respectively.

EXAMPLE 7

A first Ag cleaner part coated with 0.26 g of a first Ag catalyst comprising a commercially available silica/alumina powder (silica content: 5 weight %, specific surface area: 350 m²/g) carrying 3.1 weight % of silver was prepared in the same manner as in Example 6.

A second Ag cleaner part coated with 0.26 g of a second Ag catalyst carrying 5 weight % of silver was prepared in the same manner as above.

An exhaust gas cleaner consisting of the first Ag cleaner part, the second Ag cleaner part and the W+Pt cleaner part of Example 6 in this order from the inlet side to the outlet side was disposed in a reactor pipe.

The results of the same test as in Example 6 are shown in Table 3.

EXAMPLE 8

After immersed for 20 minutes in an aqueous solution (vanadium concentration: 7.8 weight %) prepared by heating over a water bath a mixture of vanadium pentoxide, oxalic acid and water, the Pt catalyst of Example 6 was dried in air successively at 80° C., 100° C. and 120° C. each for 2 hours, and then heated from 120° C. to 500° C. over 5 hours and calcined there for 4 hours to prepare a V+Pt catalyst carrying 3.3 weight % of oxide of vanadium and 1 weight % of platinum. A slurry containing 0.26 g of the V+Pt catalyst was coated on a honeycomb cordierite filter to prepare a V+Pt cleaner part in the same manner as in Example 6.

An exhaust gas cleaner consisting of the first Ag cleaner part of Example 6, the second Ag cleaner part of Example 6 and the V+Pt cleaner part in this order from the inlet side to the outlet side was disposed in a reactor pipe. The results of the same test as in Example 6 are shown in Table 3.

Comparative Example 3

An Ag cleaner part was prepared in the same manner as in the preparation of the first Ag cleaner part of Example 6 except that 0.52 g of the first Ag catalyst of Example 6 was coated on the honeycomb cordierite filter.

Only the above Ag cleaner part was disposed in a reactor pipe. The results of the same test as in Example 6 are shown in Table 3. The apparent space velocity on the Ag catalyst was about 80,000 h⁻¹.

TABLE 3

| | Removal Ratio of NOx | | | | |
| --- | --- | --- | --- | --- | --- |
| | Exhaust Gas Temperature (°C.) | | | | |
| | 350 | 400 | 450 | 500 | 550 |
| Examples | | | | | |
| 6 | 53.6 | 79.5 | 94.7 | 95.0 | 88.6 |
| 7 | 48.7 | 78.8 | 90.1 | 92.9 | 85.8 |
| 8 | 58.1 | 82.5 | 93.4 | 94.8 | 87.2 |
| Comparative Example | | | | | |
| 3 | 24.5 | 46.8 | 68.7 | 82.6 | 78.5 |

As seen from Table 3, as compared with Comparative Example 3 where only one Ag catalyst was used, Examples 6–8 showed high removal efficiency of nitrogen oxides in a wide temperature range of exhaust gas. Further, it was confirmed that carbon monoxide, hydrocarbons and SOF were also effectively removed by oxidation.

EXAMPLE 9

A first Ag cleaner part coated with 0.26 g of a first Ag catalyst comprising a commercially available γ-alumina powder (specific surface area: 200 m²/g) carrying 3.1 weight % of silver was prepared in the same manner as in Example 1.

A second Ag cleaner part coated with 0.26 g of a second Ag catalyst carrying 5.0 weight % of silver was prepared in the same manner as above.

A W cleaner part coated with 0.26 g of a W catalyst comprising a titania powder (specific surface area: 35 m²/g) carrying 7.4 weight % of oxide of tungsten was prepared in the same manner as in Example 6.

An exhaust gas cleaner consisting of the first Ag cleaner part, the second Ag cleaner part and the W cleaner part in this order from the inlet side to the outlet side was disposed in a reactor pipe.

The results of the same test as in Example 1 are shown in Table 4. The apparent space velocity on each of the first Ag catalyst, the second Ag catalyst and the W catalyst was about 80,000 h⁻¹, respectively.

EXAMPLE 10

A first Ag cleaner part coated with 0.26 g of a first Ag catalyst comprising a commercially available silica/alumina powder (silica content: 5 weight %, specific surface area: 350 m²/g) carrying 3.1 weight % of silver was prepared in the same manner as in Example 9.

A second Ag cleaner part coated with 0.26 g of a second Ag catalyst carrying 5 weight % of silver was prepared in the same manner as above.

An exhaust gas cleaner consisting of the first Ag cleaner part, the second Ag cleaner part and the W cleaner part of Example 9 in this order from the inlet side to the outlet side was disposed in a reactor pipe.

The results of the same test as in Example 9 are shown in Table 4.

EXAMPLE 11

A V cleaner part coated with 0.26 g of a V catalyst comprising a titania powder (specific surface area: 35 m²/g) carrying 4.8 weight % of oxides of vanadium was prepared in the same manner as in Example 8.

An exhaust gas cleaner consisting of the first Ag cleaner part of Example 9, the second Ag cleaner part of Example 9 and the V cleaner part in this order from the inlet side to the outlet side was disposed in a reactor pipe.

The results of the same test as in Example 9 are shown in Table 4.

EXAMPLE 12

A W catalyst comprising a titania powder (specific surface area: 35 m²/g) carrying 4.5 weight % of oxides of tungsten was prepared in the same manner as in Example 9. On the W catalyst, 2.2 weight % of oxides of vanadium were further carried in the same manner as in Example 11. A W+V cleaner part coated with 0.26 g of the W+V catalyst was prepared in the same manner as in Example 9.

An exhaust gas cleaner consisting of the first Ag cleaner part of Example 9, the second Ag cleaner part of Example 9 and the W+V cleaner part in this order from the inlet side to the outlet side was disposed in a reactor pipe.

The results of the same test as in Example 9 are shown in Table 4.

EXAMPLE 13

A Pt catalyst comprising a titania powder (specific surface area: 35 m²/g) carrying 0.21 weight % of platinum was prepared in the same manner as in Example 1. A W/Pt cleaner part coated with 0.26 g of a mixed catalyst of the W catalyst of Example 9 and the Pt catalyst (40:1 by weight) was prepared in the same manner as in Example 9.

An exhaust gas cleaner consisting of the first Ag cleaner part of Example 9, the second Ag cleaner part of Example 9 and the W/Pt cleaner part in this order from the inlet side to the outlet side was disposed in a reactor pipe.

The results of the same test as in Example 9 are shown in Table 4.

EXAMPLE 14

An exhaust gas cleaner consisting of the first Ag cleaner part of Example 10, the second Ag cleaner part of Example 10 and the W/Pt cleaner part of Example 13 in this order from the inlet side to the outlet side was disposed in a reactor pipe.

The results of the same test as in Example 9 are shown in Table 4.

EXAMPLE 15

A V/Pt cleaner part coated with 0.26 g of a mixed catalyst of the V catalyst of Example 11 and the Pt catalyst of Example 13 (20:1 by weight) was prepared in the same manner as in Example 9.

An exhaust gas cleaner consisting of the first Ag cleaner part of Example 9, the second Ag cleaner part of Example 9 and the V/Pt cleaner part in this order from the inlet side to the outlet side was disposed in a reactor pipe.

The results of the same test as in Example 9 are shown in Table 4.

EXAMPLE 16

A W+V/Pt cleaner part coated with 0.26 g of a mixed catalyst of the W+V catalyst of Example 12 and the Pt catalyst of Example 13 (10:1 by weight) was prepared in the same manner as in Example 9.

An exhaust gas cleaner consisting of the first Ag cleaner part of Example 9, the second Ag cleaner part of Example 9 and the W+V/Pt cleaner part in this order from the inlet side to the outlet side was disposed in a reactor pipe.

The results of the same test as in Example 9 are shown in Table 4.

Comparative Example 4

An Ag cleaner part was prepared in the same manner as in the preparation of the first Ag cleaner part of Example 9 except that 0.26 g of the first Ag catalyst of Example 9 was coated on a honeycomb cordierite filter (diameter: 20 mm, length: 8.3 mm, 400 cells/in$^2$).

Only the above Ag cleaner part was disposed in a reactor pipe. The results of the same test as in Example 9 are shown in Table 4. The apparent space velocity on the Ag catalyst was about 80,000 h$^{-1}$.

TABLE 4

| | Removal Ratio of NOx | | | | |
| --- | --- | --- | --- | --- | --- |
| | Exhaust Gas Temperature (°C.) | | | | |
| | 350 | 400 | 450 | 500 | 550 |
| Examples | | | | | |
| 9 | 57.6 | 78.5 | 94.7 | 95.0 | 90.6 |
| 10 | 54.4 | 77.8 | 91.1 | 93.9 | 89.8 |

TABLE 4-continued

| | Removal Ratio of NOx | | | | |
| --- | --- | --- | --- | --- | --- |
| | Exhaust Gas Temperature (°C.) | | | | |
| | 350 | 400 | 450 | 500 | 550 |
| 11 | 60.1 | 80.5 | 94.4 | 94.8 | 87.2 |
| 12 | 60.8 | 78.7 | 93.8 | 94.1 | 89.6 |
| 13 | 58.6 | 79.5 | 91.7 | 93.0 | 88.6 |
| 14 | 56.4 | 78.g | 88.1 | 92.9 | 85.8 |
| 15 | 62.1 | 82.5 | 92.4 | 93.8 | 84.2 |
| 16 | 64.8 | 79.7 | 91.8 | 93.1 | 85.6 |
| Comparative Example | | | | | |
| 4 | 20.5 | 30.5 | 35.7 | 42.6 | 40.5 |

As seen from Table 4, as compared with Comparative Example 4 where only one Ag catalyst was used, Examples 9–16 showed high removal efficiency of nitrogen oxides in a wide temperature range of exhaust gas. Further, it was confirmed that carbon monoxide and hydrocarbons were also effectively removed by oxidation in Examples 13–16 where a Pt catalyst was used.

EXAMPLE 17

An Ag cleaner part coated with 0.26 g of a first Ag catalyst comprising a commercially available γ-alumina powder (specific surface area: 200 m$^2$/g) carrying 3 weight % of silver was prepared in the same manner as in the preparation of the first Ag catalyst of Example 1.

In the same manner as in Example 6, 5.8 weight % of oxide of tungsten was carried on titania powder (specific surface area: 35 m$^2$/g). After immersed in an aqueous solution of copper sulfate for 20 minutes, the titania powder was dried and calcined in the same manner as in the case of carrying tungsten oxide to prepare a Cu+W catalyst carrying 4.0 weight % of copper sulfate and 5.8 weight % of oxide of tungsten. A Cu+W cleaner part coated with 0.26 g of the Cu+W catalyst was prepared in the same manner as above.

A W+Pt cleaner part coated with 0.26 g of a W+Pt catalyst comprising a titania powder (specific surface area: 35 m$^2$/g) carrying 1 weight % of platinum and 3 weight % of oxides of tungsten was prepared in the same manner as in Example 6.

An exhaust gas cleaner consisting of the Ag cleaner part, the Cu+W cleaner part and the W+Pt cleaner part in this order from the inlet side to the outlet side was disposed in a reactor pipe.

The results of the same test as in Example 1 are shown in Table 5 together with the results of Comparative Example 4. The apparent space velocity on each of the Ag catalyst, the Cu+W catalyst and the W+Pt catalyst was about 80,000 h$^{-1}$, respectively.

EXAMPLE 18

An Ag cleaner part coated with 0.26 g of an Ag catalyst comprising a commercially available silica/alumina powder (silica content: 5 weight %, specific surface area: 350 m$^2$/g) carrying 3.1 weight % of silver was prepared in the same manner as in Example 17.

A Cu cleaner part coated with 0.26 g of a Cu catalyst comprising a titania powder (specific surface area: 35 m$^2$/g) carrying 4.0 weight % of copper sulfate was prepared in the same manner as in Example 17.

An exhaust gas cleaner consisting of the Ag cleaner part, the Cu cleaner part and the W+Pt cleaner part of Example 17 in this order from the inlet side to the outlet side was disposed in a reactor pipe.

The results of the same test as in Example 17 are shown in Table 5.

EXAMPLE 19

A V catalyst comprising a titania powder (specific surface area: 35 m$^2$/g) carrying 4.8 weight % of oxides of vanadium was prepared in the same manner as in Example 8. On this V catalyst, 4.5 weight % of copper sulfate were further carried in the same manner as in Example 17 to prepare a Cu+V catalyst. A Cu+V cleaner part coated with 0.26 g of the Cu+V catalyst was prepared in the same manner as in Example 17.

An exhaust gas cleaner consisting of the Ag cleaner part of Example 17, the Cu+V cleaner part and the W+Pt cleaner part of Example 17 in this order from the inlet side to the outlet side was disposed in a reactor pipe.

The results of the same test as in Example 17 are shown in Table 5.

EXAMPLE 20

A Cu+V cleaner part coated with 0.26 g of the Cu+V catalyst comprising a titania powder (specific surface area: 35 m$^2$/g) carrying 2.2 weight % of oxides of vanadium and 4.5 weight % of oxides of copper was prepared in the same manner as in Example 19 except for using an aqueous solution of copper nitrate in place of the aqueous solution of copper sulfate.

An exhaust gas cleaner consisting of the Ag cleaner part of Example 17, the Cu+V cleaner part and the W+Pt cleaner part of Example 17 in this order from the inlet side to the outlet side was disposed in a reactor pipe.

The results of the same test as in Example 17 are shown in Table 5.

EXAMPLE 21

A Cu cleaner part coated with 0.26 g of the Cu catalyst comprising a titania powder (specific surface area: 50 m$^2$/g) carrying 4.5 weight % of oxides of copper was prepared in the same manner as in Example 17 except for using an aqueous solution of copper nitrate (Cu concentration: 9.5 weight %) in place of the aqueous solution of copper sulfate.

An exhaust gas cleaner consisting of the Ag cleaner part of Example 17, the Cu cleaner part and the W+Pt cleaner part of Example 17 in this order from the inlet side to the outlet side was disposed in a reactor pipe. The results of the same test as in Example 17 are shown in Table 5.

TABLE 5

| | Removal Ratio of NOx | | | | |
|---|---|---|---|---|---|
| | Exhaust Gas Temperature (°C.) | | | | |
| | 350 | 400 | 450 | 500 | 550 |
| Examples | | | | | |
| 17 | 65.1 | 78.5 | 88.7 | 91.0 | 81.6 |
| 18 | 67.4 | 79.8 | 89.1 | 93.9 | 84.8 |
| 19 | 65.1 | 77.5 | 87.4 | 94.8 | 83.2 |
| 20 | 69.8 | 79.7 | 83.8 | 94.9 | 81.6 |
| 21 | 50.2 | 68.6 | 79.5 | 82.8 | 78.5 |
| Comparative Example | | | | | |
| 4 | 20.5 | 30.5 | 35.7 | 42.6 | 40.5 |

As seen from Table 5, as compared with Comparative Example 4 where only one Ag catalyst was used, Examples 17–21 showed high removal efficiency of nitrogen oxides in a wide temperature range of exhaust gas. Further, it was confirmed that carbon monoxide, hydrocarbons and SOF were also effectively removed by oxidation.

EXAMPLE 22

An Ag cleaner part coated with 0.26 g of a first Ag catalyst comprising a commercially available γ-alumina powder (specific surface area: 200 m$^2$/g) carrying 3.1 weight % of silver was prepared in the same manner as in Example 17.

A Cu catalyst comprising a titania powder (specific surface area: 50 m$^2$/g) carrying 4.4 weight % of copper sulfate was prepared in the same manner as in Example 17.

After immersed in an aqueous solution of chloroplatinic acid for 20 minutes, γ-alumina powder (specific surface area: 200 m$^2$/g) was dried in air at 80° C. for 2 hours. The dried powder was calcined at 120° C. for 2 hours in nitrogen stream, and further calcined at 200°–400° C. for one hour while heated stepwise to prepare a Pt catalyst. After immersed in an aqueous solution prepared by heating over a water bath a mixture of ammonium tungstate parapentahydrate, oxalic acid and water, the Pt catalyst was dried, and then heated to 600° C. to be calcined to prepare a W+Pt catalyst carrying 0.3 weight % of oxide of tungsten and 0.21 weight % of platinum.

A Cu/W+Pt cleaner part coated with a slurry containing 0.26 g of a mixed catalyst of the Cu catalyst and the W+Pt catalyst (40:1 by weight) was prepared in the same manner as in the preparation of the above Ag cleaner part.

An exhaust gas cleaner consisting of the Ag cleaner part on the inlet side and the Cu/W+Pt cleaner part on the outlet side was disposed in a reactor pipe.

The results of the same test as in Example 1 are shown in Table 6. The apparent space velocity on each of the Ag catalyst and the mixed catalyst was about 80,000 h$^{-1}$, respectively.

Comparative Example 5

A Pt cleaner part coated with 0.26 g of the Pt catalyst of Example 22 was prepared in the same manner as in the preparation of the Ag cleaner part of Example 22.

An exhaust gas cleaner consisting of the Ag cleaner part of Example 22 on the inlet side and the Pt cleaner part on the outlet side was disposed in a reactor pipe.

The results of the same test as in Example 22 are shown in Table 6.

TABLE 6

| | Removal Ratio of NOx | | | | |
|---|---|---|---|---|---|
| | Exhaust Gas Temperature (°C.) | | | | |
| | 300 | 350 | 400 | 450 | 500 |
| Examples | | | | | |
| 22 | 67.5 | 79.6 | 84.2 | 83.8 | 79.2 |
| Comparative Example | | | | | |
| 5 | 20.5 | 32.5 | 38.7 | 42.6 | 40.5 |

As seen from Table 6, as compared with Comparative Example 5 where only one Ag catalyst and Pt catalyst were used, Example 22 showed high removal efficiency of nitrogen oxides in a wide temperature range of exhaust gas.

EXAMPLE 23

An Ag catalyst comprising silica/alumina powder (silica content: 5 weight %, specific surface area: 350 m$^2$/g) carrying 3.1 weight % of silver was prepared in the same manner as in Example 17.

A Cu catalyst comprising titania powder (specific surface area: 35 m²/g) carrying 4.4 weight % of copper sulfate was prepared in the same manner as in Example 17.

An Ag/Cu cleaner part comprising a honeycomb cordierite filter (diameter: 20 mm, length: 13.2 mm, 400 cells/in²) coated with a slurry of a mixed catalyst of 0.35 g of the Ag catalyst and 0.12 g of the Cu catalyst was prepared in the same manner as in Example 17.

An exhaust gas cleaner consisting of the Ag/Cu cleaner part was disposed in a reactor pipe.

The results of the same test as in Example 1 are shown in Table 7. The apparent space velocity on the Ag/Cu catalyst was about 50,000 h⁻¹.

EXAMPLE 24

An Ag catalyst comprising γ-alumina powder (specific surface area: 200 m²/g) carrying 3.0 weight % of silver was prepared in the same manner as in Example 23.

After immersing zeolite powder ($SiO_2$: $Al_2O_3$=27:1 (molar ratio)), the zeolite exchanged with copper ion was dried in air successively at 80° C., 100° C. and 120° C. each for 2 hours. The dried zeolite were then heated from 120° C. to 400° C. stepwise to prepare an Cu catalyst carrying 5.19 weight % of oxide of copper. An Ag/Cu cleaner part coated with a slurry of a mixed catalyst of 0.35 g of the Ag catalyst and 0.12 g of the Cu catalyst was prepared in the same manner as in Example 23.

An exhaust gas cleaner consisting of the Ag/Cu cleaner part was disposed in a reactor pipe. The results of the same test as in Example 23 are shown in Table 7.

EXAMPLE 25

An Ag catalyst comprising γ-alumina powder (specific surface area: 200 m²/g) carrying 3.0 weight % of silver was prepared in the same manner as in Example 24.

After immersing in an aqueous solution of copper nitrate, lanthanum nitrate and cesium nitrate for 20 minutes, the γ-alumina powder (specific surface area: 200 m²/g) was subjected to the same drying step and calcining step as in Example 23 to prepare a Cu catalyst carrying 10.0 weight % of oxides of copper, 0.4 weight % of lanthanum and 0.4 weight % of cesium. An Ag/Cu cleaner part coated with a slurry of a mixed catalyst of 0.35 g of the Ag catalyst and 0.12 g of the Cu catalyst was prepared in the same manner as in Example 23.

An exhaust gas cleaner consisting of the Ag/Cu cleaner part was disposed in a reactor pipe. The results of the same test as in Example 23 are shown in Table 7.

EXAMPLE 26

A Cu+V catalyst comprising a titania powder (specific surface area: 35 m²/g) carrying 4.8 weight % of oxides of vanadium and 4.5 weight % of copper sulfate was prepared in the same manner as in Example 19. An Ag/Cu cleaner part coated with a slurry of a mixed catalyst of 0.35 g of the Ag catalyst of Example 25 and 0.12 g of the Cu catalyst was prepared in the same manner as in Example 23.

An exhaust gas cleaner consisting of the Ag/Cu cleaner part was disposed in a reactor pipe. The results of the same test as in Example 23 are shown in Table 7.

EXAMPLE 27

In the same manner as in Example 1, a Pt cleaner part coated with a Pt catalyst comprising titania powder (specific surface area: 35 m²/g) carrying 1 weight % of platinum was prepared.

An exhaust gas cleaner consisting of the Ag/Cu cleaner part of Example 23 on the inlet side and the Pt cleaner part on the outlet side was disposed in a reactor pipe. The results of the same test as in Example 23 are shown in Table 7. The apparent space velocity was about 50,000 h⁻¹ on the Ag/Cu catalyst and about 100,000 h⁻¹ on the Pt catalyst.

EXAMPLE 28

A V+Pt cleaner part comprising a honeycomb cordierite filter (diameter: 20 mm, length: 6.6 mm, 400 cells/in²) coated with 0.26 g a V+Pt catalyst comprising a titania powder (specific surface area: 35 m²/g) carrying 1 weight % of platinum and 3.3 weight % of oxides of vanadium was prepared in the same manner as in Example 8.

An exhaust gas cleaner consisting of the Ag/Cu cleaner part of Example 23 on the inlet side and the V+Pt cleaner part on the outlet side was disposed in a reactor pipe. The results of the same test as in Example 23 are shown in Table 7. The apparent space velocity was about 50,000 h⁻¹ on the Ag/Cu catalyst and about 100,000 h⁻¹ on the V+Pt catalyst.

Comparative Example 6

An Ag cleaner part comprising a honeycomb cordierite filter (diameter: 20 mm, length: 6.6 mm, 400 cells/in²) coated with 0.26 g of the Ag catalyst of Example 24 was prepared in the same manner as in Example 23.

An exhaust gas cleaner consisting of the Ag cleaner part was disposed in a reactor pipe. The results of the same test as in Example 23 are shown in Table 7. The apparent space velocity on the Ag catalyst was about 50,000 h⁻¹.

TABLE 7

| | Removal Ratio of NOx | | | | | | |
|---|---|---|---|---|---|---|---|
| | Exhaust Gas Temperature (°C.) | | | | | | |
| | 300 | 350 | 400 | 450 | 00 | 550 | 600 |
| Examples | | | | | | | |
| 23 | 34.8 | 53.2 | 68.1 | 64.5 | 60.4 | 55.3 | 54.3 |
| 24 | 35.4 | 56.7 | 70.3 | 64.7 | 59.4 | 53.7 | 50.6 |
| 25 | 35.6 | 54.7 | 68.5 | 64.7 | 60.4 | 56.8 | 54.3 |
| 26 | 30.4 | 52.2 | 63.6 | 60.3 | 58.4 | 50.5 | 49.5 |
| 27 | 27.7 | 47.8 | 59.7 | 54.0 | 50.4 | 47.8 | 46.7 |
| 28 | 28.2 | 48.6 | 60.6 | 54.6 | 50.3 | 46.8 | 45.8 |
| Comparative Example | | | | | | | |
| 6 | 6.5 | 15.6 | 33.6 | 38.9 | 43.3 | 45.7 | 43.7 |

As seen from Table 7, as compared with Comparative Example 6 where only Ag catalyst was used, Examples 23–28 showed high removal efficiency of nitrogen oxides in a wide temperature range of exhaust gas.

What is claimed is:

1. A method for removing nitrogen oxides by reduction from an exhaust gas containing nitrogen oxides and oxygen in an amount larger than its stoichiometric amount relative to unburned components in said exhaust gas, which comprises:

disposing an exhaust gas cleaner in a flow path of said exhaust gas;

introducing into said exhaust gas at least one reducing agent selected from the group consisting of hydrocarbons and oxygen-containing organic compounds on an upstream side of said exhaust gas cleaner; and bringing the resulting exhaust gas containing said reducing agent into contact with said exhaust gas cleaner at 150°–650° C., thereby causing a reaction of said nitrogen oxides with said reducing agent to remove said nitrogen oxides by reduction, said exhaust gas cleaner consisting essentially of in series;
a first Ag catalyst consisting essentially of a first porous inorganic oxide supporting 0.2–12 weight % of at least one Ag component selected from the group consisting of Ag and compounds of Ag;
a second Ag catalyst downstream of said first catalyst, and consisting essentially of a different quantity of a first porous inorganic oxide supporting 0.5–15 weight % of at least one Ag component selected from the group consisting of Ag and compounds of Ag, the amount of Ag component carried on said second Ag catalyst being larger than that of said first Ag catalyst;
a transition metal catalyst downstream of said second catalyst, and selected from the group consisting of a Pt catalyst, a W catalyst, a V catalyst, a codeposited W+V catalyst, a W+Pt catalyst, a V+Pt catalyst, and a physically mixed catalyst of a Pt catalyst and any one of said W catalyst, V catalyst and W+V catalyst,
said Pt catalyst consisting essentially of a second porous inorganic oxide supporting 0.01–5 weight % of Pt,
said W catalyst, V catalyst and W+V catalyst respectively consisting essentially of a third porous inorganic oxide supporting 0.5–30 weight % of an oxide of W, an oxide of V, and both said W and V oxides,
said W+Pt catalyst and V+Pt catalyst respectively consisting essentially of a fourth porous inorganic oxide supporting 0.01–5 weight % of Pt and 0.2–10 weight % of W or V, and
said mixed catalyst consisting essentially of (i) a fifth porous inorganic oxide supporting 0.01–5 weight % of Pt mixed with (ii) a sixth porous inorganic oxide supporting 0.2–10 wt % of V or W+V,
the weight percentages being expressed by metal basis and being based on the amount of each porous inorganic oxide.

2. A method for removing nitrogen oxides by reduction from an exhaust gas containing nitrogen oxides and oxygen in an amount larger than its stoichiometric amount relative to unburned components in said exhaust gas, which comprises:
disposing an exhaust gas cleaner in a flow path of said exhaust gas;
introducing into said exhaust gas at least one reducing agent selected from the group consisting of hydrocarbons and oxygen-containing organic compounds on an upstream side of said exhaust gas cleaner; and
bringing the resulting exhaust gas containing said reducing agent into contact with said exhaust gas cleaner at 150°–650° C., thereby causing a reaction of said nitrogen oxides with said reducing agent to remove said nitrogen oxides by reduction,
said exhaust gas cleaner consisting essentially of:
an Ag catalyst consisting essentially of a first porous inorganic oxide supporting 0.2–15 weight % of at least one Ag component selected from the group consisting of Ag and compounds of Ag;
a Cu catalyst consisting essentially of a second porous inorganic oxide supporting 0.2–30 weight % of at least one Cu component selected from the group consisting of oxides and sulfates of Cu, and optionally 30 weight % or less of W or V and
a W+Pt catalyst consisting essentially of a third porous inorganic oxide supporting 0.01–5 weight % of Pt, and 0.2–10 weight % of W,
the weight percentages being expressed by metal basis and being based on the amount of each porous inorganic oxide, and
said Ag catalyst, Cu catalyst and W+Pt catalyst being disposed in this order from inlet side to outlet side of said exhaust gas cleaner.

3. A method for removing nitrogen oxides by reduction from an exhaust gas containing nitrogen oxides and oxygen in an amount larger than its stoichiometric amount relative to unburned components in said exhaust gas, which comprises:
disposing an exhaust gas cleaner in a flow path of said exhaust gas;
introducing into said exhaust gas at least one reducing agent selected from the group consisting of hydrocarbons and oxygen-containing organic compounds on an upstream side of said exhaust gas cleaner; and
bringing the resulting exhaust gas containing said reducing agent into contact with said exhaust gas cleaner at 150°–650° C., thereby causing a reaction of said nitrogen oxides with said reducing agent to remove said nitrogen oxides by reduction,
said exhaust gas cleaner consisting essentially of:
a mixed catalyst of mixed particles of an Ag catalyst and a Cu catalyst, said Ag catalyst consisting essentially of particles of a first porous inorganic oxide supporting 0.2–15 weight % of at least one Ag component selected from the group consisting of Ag and compounds of Ag, and said Cu catalyst consisting essentially of particles of a second porous inorganic oxide supporting 0.5–30 weight % of at least one Cu component selected from the group consisting of Cu and compounds of Cu, and optionally 5 weight % or less of at least one component selected from the group consisting of K, Cs, La and Ce, or 30 weight % or less of at least one component selected from the group consisting of oxides of W and V, and
an optional Pt catalyst consisting essentially of a third porous inorganic oxide supporting 0.01–5 weight % of at least one component selected from the group consisting of Pt and Pd, or an optional W+Pt catalyst consisting essentially of a fourth porous inorganic oxide supporting 0.2–10 weight % of at least one component selected from the group consisting of oxides of W, V and Mo, and 0.01–5 weight % of at least one component selected from the group consisting of Pt and Pd,
the weight percentages being expressed by metal basis and being based on the amount of each porous inorganic oxide, and
said mixed catalyst and said Pt or W+Pt metal catalyst being respectively disposed on inlet side and outlet side of said exhaust gas cleaner.

4. A method according to claim 1 wherein said first porous inorganic oxide is selected from the group consisting of alumina, silica, titania, zirconia, zeolite and composite oxides thereof;
said second porous inorganic oxide is selected from the group consisting of alumina, titania, zirconia, silica, zeolite and composite oxides thereof;
said third porous inorganic oxide is selected from the group consisting of alumina, titania, zeolite and composite oxides thereof; and
said fourth porous inorganic oxide is selected from the group consisting of alumina, titania, zirconia, silica, zeolite and composite oxides thereof.

5. The method according to claim 1, wherein said second Ag catalyst and said Pt catalyst are physically mixed together to constitute a mixed catalyst.

6. The method according to claim 2, wherein said Cu catalyst and said W+Pt catalyst are physically mixed together to constitute a mixed catalyst.

* * * * *